United States Patent
Doering et al.

(10) Patent No.: US 9,758,149 B2
(45) Date of Patent: Sep. 12, 2017

(54) HYBRID VEHICLE AND DOWNSHIFTING STRATEGY IN A HYBRID VEHICLE

(71) Applicant: FORD GLOBAL TECHNOLOGIES, LLC, Dearborn, MI (US)

(72) Inventors: Jeffrey Allen Doering, Canton, MI (US); Xiaoyong Wang, Novi, MI (US); Felix Nedorezov, Rochester Hills, MI (US); Chen Zhang, Westland, MI (US); Todd McCullough, Bloomfield Hills, MI (US); Rajit Johri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 14/603,749

(22) Filed: Jan. 23, 2015

(65) Prior Publication Data

US 2016/0214599 A1   Jul. 28, 2016

(51) Int. Cl.
| | |
|---|---|
| *B60W 10/06* | (2006.01) |
| *B60W 20/00* | (2016.01) |
| *B60W 10/11* | (2012.01) |
| *B60W 30/19* | (2012.01) |
| *B60W 20/40* | (2016.01) |
| *B60W 10/02* | (2006.01) |
| *B60K 6/387* | (2007.10) |
| *B60K 6/547* | (2007.10) |
| *B60W 10/08* | (2006.01) |
| *B60K 6/48* | (2007.10) |

(52) U.S. Cl.
CPC ............. *B60W 10/11* (2013.01); *B60K 6/387* (2013.01); *B60K 6/547* (2013.01); *B60W 10/02* (2013.01); *B60W 10/06* (2013.01); *B60W 10/08* (2013.01); *B60W 20/40* (2013.01); *B60W 30/19* (2013.01); *B60K 2006/4825* (2013.01); *B60W 2510/025* (2013.01); *B60W 2510/0233* (2013.01); *B60W 2510/1015* (2013.01); *B60W 2520/10* (2013.01); *B60W 2540/10* (2013.01); *B60W 2710/1005* (2013.01); *Y02T 10/6252* (2013.01); *Y02T 10/6286* (2013.01); *Y02T 10/84* (2013.01); *Y10S 903/93* (2013.01)

(58) Field of Classification Search
CPC ...... B60W 10/06; B60W 20/40; B60W 10/08; B60W 10/11; B60W 2710/081; B60W 2510/1005; Y10T 477/26; Y10T 477/23
See application file for complete search history.

(56) References Cited

U.S. PATENT DOCUMENTS

| | | |
|---|---|---|
| 5,046,174 A | 9/1991 | Lentz et al. |
| 5,079,970 A | 1/1992 | Butts et al. |

(Continued)

*Primary Examiner* — Ramya Burgess
*Assistant Examiner* — Lillian Nguyen
(74) *Attorney, Agent, or Firm* — David Kelley; Brooks Kushman P.C.

(57) ABSTRACT

A vehicle includes an engine, an electric machine, an engine disconnect clutch, and a transmission input configured to transmit power from the engine and electric machine to a transmission. The vehicle also includes a controller program to close the disconnect clutch and start the engine before downshifting in response to an anticipated transmission downshift in which a predicted speed of the transmission input after the downshift will be outside a predetermined speed range or a torque capacity of the electric machine will be less than a predicted required torque after the downshift.

14 Claims, 3 Drawing Sheets

(56) References Cited

U.S. PATENT DOCUMENTS

| | | |
|---|---|---|
| 6,243,510 B1 | 6/2001 | Rauch et al. |
| 7,517,298 B2 | 4/2009 | Ortmann |
| 7,559,386 B2 | 7/2009 | Gu et al. |
| 8,086,379 B2 | 12/2011 | Sugiura et al. |
| 8,315,755 B2 | 11/2012 | Hirata et al. |
| 8,386,140 B2 | 2/2013 | Tsuda et al. |
| 2008/0125927 A1 | 5/2008 | Gohring et al. |
| 2011/0118915 A1 | 5/2011 | Ortmann et al. |
| 2011/0172862 A1 | 7/2011 | Ortmann et al. |
| 2011/0246009 A1 | 10/2011 | Hase et al. |
| 2012/0083385 A1 | 4/2012 | Smith et al. |
| 2012/0083952 A1 | 4/2012 | Smith et al. |
| 2012/0202646 A1* | 8/2012 | Suzuki ............ B60W 10/02 477/5 |
| 2012/0265382 A1 | 10/2012 | Nefcy et al. |
| 2012/0303199 A1 | 11/2012 | Oba et al. |
| 2013/0060411 A1 | 3/2013 | Kaltenbach |
| 2013/0124027 A1 | 5/2013 | Tanishima et al. |
| 2013/0179014 A1 | 7/2013 | Yamazaki et al. |
| 2013/0297160 A1 | 11/2013 | Kar et al. |

* cited by examiner

HYBRID VEHICLE AND DOWNSHIFTING STRATEGY IN A HYBRID VEHICLE

TECHNICAL FIELD

The present disclosure relates to a hybrid vehicle and a method of downshifting a transmission in a hybrid vehicle

BACKGROUND

When a hybrid vehicle is operating in an electric mode and a transmission downshift is proposed, the energy losses that may occur when closing a disconnect clutch to start an engine after a downshift may be larger than the energy losses that would occur if the disconnect clutch was closed prior to the downshift to start the engine. In addition, the torque requirement after the downshift may be larger than the torque capability of the electric-machine that is powering the hybrid vehicle in the electric mode.

SUMMARY

A method of downshifting a transmission in a hybrid vehicle is provided. The method includes in closing a disconnect clutch configured to selectively couple an engine and electric machine, starting the engine, and downshifting the transmission after starting the engine in response to an anticipated downshift in which a predicted speed of an input to the transmission after the downshift will be outside a predetermined speed range.

A method of downshifting a transmission in a hybrid vehicle is provided. The method includes closing a disconnect clutch configured to selectively couple an engine and electric machine, starting the engine, and downshifting the transmission after starting the engine in response to an anticipated downshift in which a torque capacity of an electric machine will be less than a predicted torque requirement after the downshift.

A vehicle is provided. The vehicle includes an engine, an electric machine, a disconnect clutch configured to selectively couple the engine and electric machine, and a transmission input configured to transmit power from the engine and electric machine to a transmission. The vehicle also includes a controller programmed to close the disconnect clutch and start the engine before downshifting in response to an anticipated transmission downshift in which a predicted speed of the transmission input after the downshift will be outside a predetermined speed range or a torque capacity of the electric machine will be less than a predicted required torque after the downshift.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
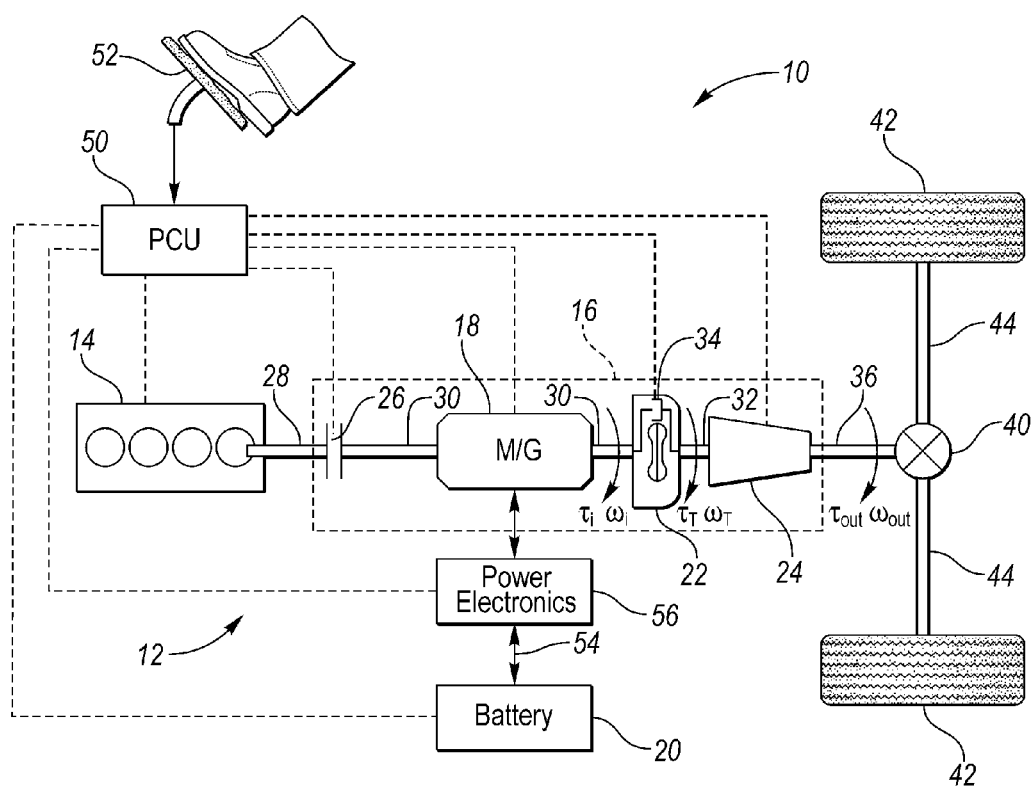
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30, a stator, and a turbine fixed to a transmission input shaft 32. The torque converter 22 thus provides a hydraulic coupling between shaft 30 and transmission input shaft 32. The torque converter 22 is configured to transmit the power from the engine 14 and M/G 18 to the transmission 24 (or gearbox). Internally, the torque converter 22 transmits power from the impeller to the turbine when the impeller rotates faster than the turbine. The power on the impeller is represented by $\tau_i\omega_i$, where $\tau_i$ is the impeller torque and $\omega_i$ is the speed of the impeller. The power on the turbine is represented by $\tau_t\omega_t$, where $\tau_t$ is the turbine torque and $\omega_t$ is the speed of the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and torque converter bypass clutch 34 is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output power and torque to output shaft 36. The powertrain output power and torque may also be referred to as the transmission output power and torque. The powertrain output power is represented by $\tau_{out}\omega_{out}$, where $\tau_{out}$ is the output torque of the powertrain and $\omega_{out}$ is the output speed of the powertrain.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel.

The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
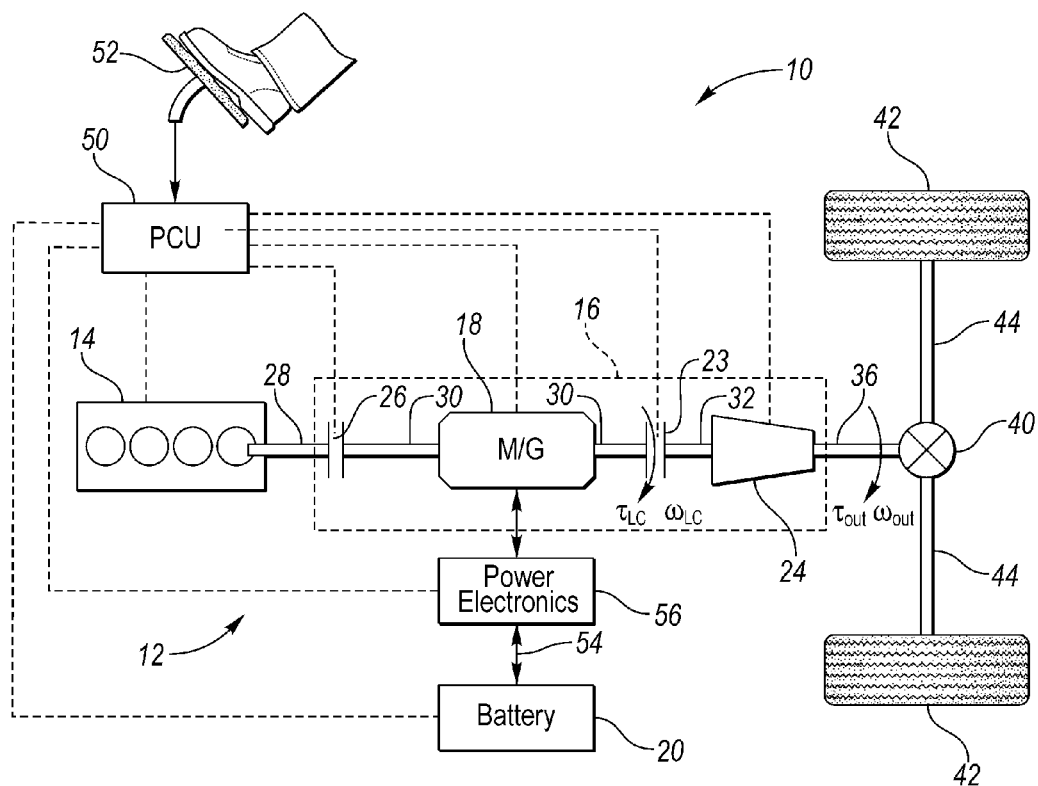
FIG. 2 is a alternative illustration of an exemplary powertrain of a hybrid electric vehicle.

Referring to FIG. 2, an alternative embodiment is depicted that includes a launch clutch 23. The launch clutch 23 is similar to disconnect clutch 26 and is provided between the M/G 18 and gearbox 24 for applications that do not include a torque converter 22 or a torque converter bypass clutch 34. The power on the launch clutch 23 is represented by $\tau_{LC}\omega_{LC}$, where $\tau_{LC}$ is the launch clutch torque and $\omega_{LC}$ is the speed of the launch clutch 23.

The launch clutch 23 and the torque converter 22, that are used in alternative embodiments, are both configured to transmit the power from the engine 14 and M/G 18 to the transmission 24 (or gearbox). The launch clutch 23 or the torque converter 22, along with other devices that are capable of transmitting the power from the engine 14 and M/G 18 to the transmission 24, may be referred to as a transmission input or transmission input device.

Figure 3:
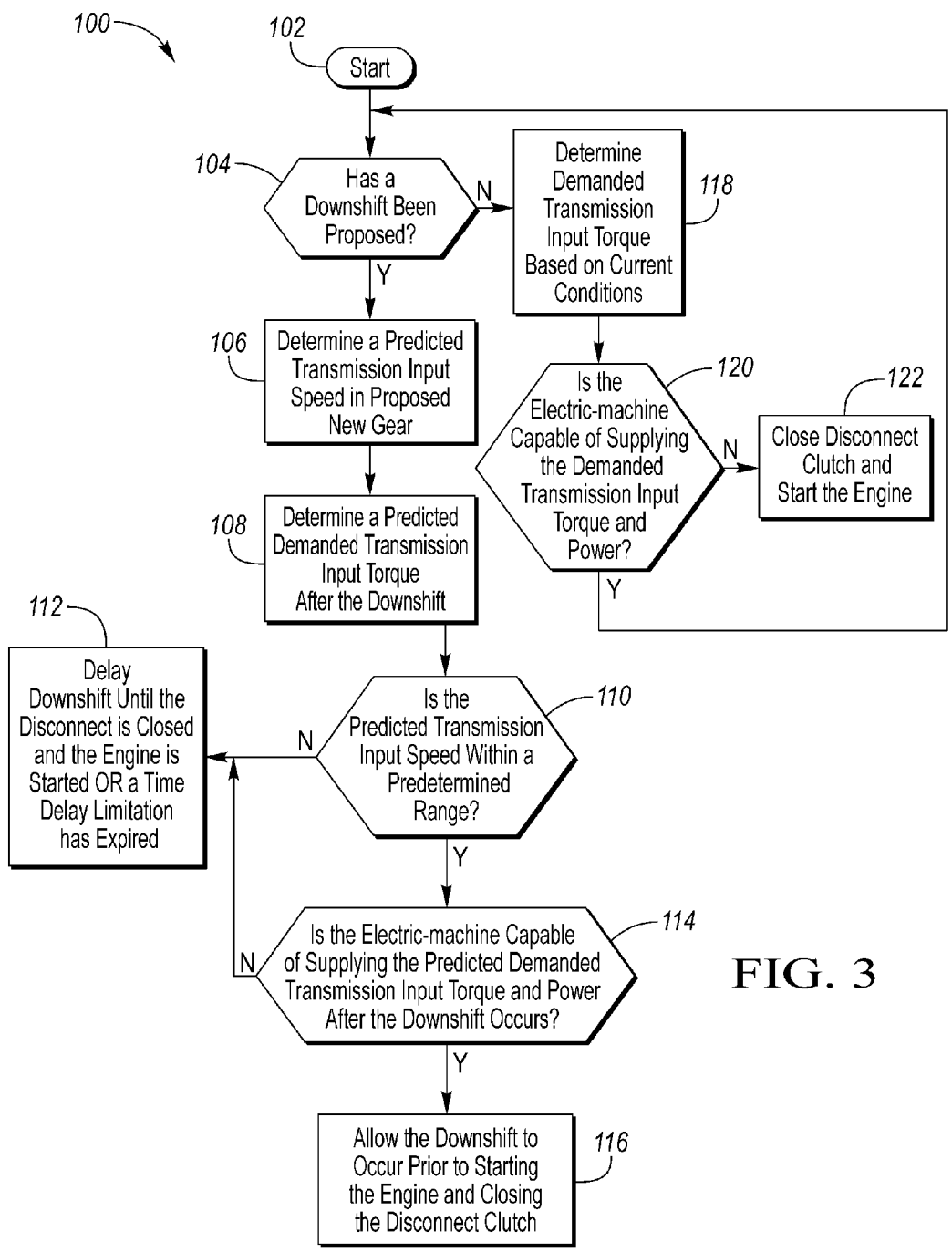
FIG. 3 is a flowchart illustrating a method of downshifting a transmission in a hybrid vehicle.

Referring to FIG. 3, a flowchart illustrating a method 100 of downshifting the transmission 24 is illustrated. The method 100 should not be construed as limited to the configuration as illustrated in FIG. 3, but should include variations where some of the steps may be rearranged and variations where some of the steps may be removed entirely. The method 100 may be implemented using software code contained within the controller 50. In other embodiments, the method 100 may be implemented in other controllers, or distributed among multiple controllers.

The method 100 is initiated at the start block 102. This may be accomplished when the vehicle begins to operate in an electric drive mode where the M/G 18 alone provides torque and power to the wheels 42.

At step 104 it is determined if a downshift in the gearing of the transmission 24 is proposed. The downshift may be derived from a shift schedule that is stored in the controller 50, or may be a manual request from the driver if the transmission includes a manual override to the automatic operation, and the transmission is operating in the manual override mode.

If a downshift in the gearing of the transmission 24 is proposed at step 104, the method 100 moves to step 106. At step 106 a predicted transmission input speed in the proposed lower gear is determined. The predicted transmission input speed may refer to a predicted impeller speed $\omega_{pi}$ of the torque converter 22 in applications that include a torque converter or a predicted speed of the launch clutch $\omega_{pLC}$ in applications where a launch clutch 23 is used in place of a torque converter 22.

In applications that include a launch clutch 23, the predicted speed of a launch clutch $6\omega_{pLC}$ may be based on the vehicle speed or output speed of the powertrain $\omega_{out}$. The launch clutch speed $\omega_{LC}$ may be proportional to the speed of the vehicle or output speed of the powertrain $\omega_{out}$, taking into account the rotational speed of the wheels 42 at a given vehicle speed and the gearing ratio through the powertrain which includes the gear selection in the transmission 24. Values or algorithms representing the relationship between the launch clutch speed $\omega_{LC}$ and the speed of the vehicle or output speed of the powertrain $\omega_{out}$ may be stored in the controller 50.

In applications that include a torque converter 22, the predicted impeller speed $\omega_{pi}$ of the torque converter 22 may be based on the vehicle speed or output speed of the powertrain $\omega_{out}$. The relationship of the predicted impeller speed $\omega_{pi}$ relative to the vehicle speed or output speed of the powertrain $\omega_{out}$ may be based on a predicted turbine speed $\omega_{pt}$ of the torque converter 22 after the proposed downshift. The impeller speed co, will have a direct relationship to the turbine speed $\omega_t$ depending on the natural characteristics of the torque converter 22. Values or algorithms representing the relationship between the impeller speed co, and the turbine speed $\omega_t$ may be stored in the controller 50. The turbine speed $\omega_t$ of the torque converter 22 may be proportional to the speed of the vehicle or output speed of the powertrain $\omega_{out}$, taking into account the rotational speed of the wheels 42 at a given vehicle speed and the gearing ratio through the powertrain which includes the gear selection in the transmission 24. The predicted impeller speed $\omega_{pi}$, may also take into account the amount of expected slip across the torque converter bypass clutch 34 and a driver demand to alter the current vehicle speed. Driver demand is further discussed below.

Next at step 108, a predicted demanded transmission input torque after the downshift is determined. The predicted demanded transmission input torque may refer to a predicted demanded impeller torque $\tau_{pdi}$ of the torque converter 22 in applications that include a torque converter or to a predicted demanded launch clutch torque $\tau_{pdLC}$ in applications where a launch clutch 23 is used in place of a torque converter 22.

In applications that include a launch clutch 23, a predicted demanded launch clutch torque $\tau_{pdLC}$ after the downshift is determined. The predicted demanded launch clutch torque $\tau_{pdLC}$ may be based on the current conditions of the vehicle and the proposed lower gear of the transmission 24. The current vehicle conditions may include the amount of torque being applied at the wheels, the power output at the wheels, the output torque of the powertrain $\tau_{out}$, the output power of the powertrain $\tau_{out}\omega_{out}$, and the current gear selection in the transmission 24. Algorithms that take into account the gearing ratio through the powertrain may be used to predict the demanded launch clutch torque $\tau_{dLC}$ after the downshift based on the current conditions by applying the current conditions to the proposed lower gear in the transmission 24.

In the alternative, lookup tables that include the demanded launch clutch torque $\tau_{dLC}$, the desired torque at the wheels, or the desired output torque of the powertrain $\tau_{dout}$ in relation to the current vehicle conditions and the gear selection of the transmission 24 may be utilized to predict the predicted demanded launch clutch torque $\tau_{pdLC}$.

In applications that include a torque converter 22, a predicted demanded impeller torque $\tau_{pdi}$ of the torque converter 22 after the downshift is determined. The predicted demanded impeller torque $\tau_{pdi}$ may be based on the current conditions of the vehicle and the proposed lower gear of the transmission 24. The current vehicle conditions may include the amount of torque being applied at the wheels, the power output at the wheels, the output torque of the powertrain $\tau_{out}$, the output power of the powertrain $\tau_{out}\omega_{out}$, the current turbine torque $\tau_t$, the current turbine power $\tau_t\omega_t$, the current impeller torque $\tau_i$, the current impeller power $\tau_i\omega_i$, and the current gear selection in the transmission 24. Algorithms that take into account the gearing ratio through the powertrain may be used to predict the demanded impeller torque $\tau_{pdi}$ after the downshift based on the current conditions by applying the current conditions to the proposed lower gear in the transmission 24.

In the alternative, lookup tables that include the demanded impeller torque $\tau_{di}$, the desired torque at the wheels, or the desired output torque of the powertrain $\tau_{dout}$ in relation to the current vehicle conditions and the gear selection of the transmission 24 may be utilized to predict the predicted demanded impeller torque $\tau_{pdi}$.

In addition to the current conditions of the vehicle and the proposed lower gear of the transmission 24, the desired acceleration from cruise control and the driver power, torque, or speed demand may also be utilized when determining the predicted demanded launch clutch torque $\tau_{pdLC}$ or the predicted demanded impeller torque $\tau_{pdi}$. The driver power, torque, or speed demand may be equivalent to the power, torque, and speed at the wheels or the power $\tau_{out}\omega_{out}$ torque $\tau_{out}$, and speed $\omega_{out}$ at the output of the powertrain. The driver power, torque, or speed demand is based on the current position of the accelerator pedal 52 plus a rate of change of the position of the accelerator pedal 52 over time. Factoring in the driver power, torque, or speed demand allows a prediction of what driver power, torque, or speed demand will be at the time after the downshift in the transmission 24 occurs.

Once the predicted transmission input speed is determined at step 106 and the predicted demanded transmission input torque is determined at step 108, the method 100 moves to step 110. At step 110 it is determined if the predicted transmission input speed is within a predetermined range in order to minimize energy losses. The predetermined range of the predicted transmission input speed may be between 500 and 6500 rpms, but is preferably between 800 and 2500 rpms. If the predicted transmission input speed is not within the predetermined range, the method 100 moves to step 112 where the downshift of the transmission 24 is delayed until the disconnect clutch 26 is closed and the engine 14 has been started, or until a time delay limitation has expired. The engine may be started with an electric starter or by closing the disconnect clutch 26. If the predicted transmission input speed is within the predetermined range, the method 100 moves to step 114.

At step 114 it is determined if the M/G 18 (electric machine) is capable of supplying the predicted demanded transmission input torque and predicted transmission power requirement (which is predicted demanded impeller torque multiplied by predicted impeller speed $\tau_{pdi}\omega_{pi}$ in applications that include a torque converter 22 and predicted demanded launch clutch torque multiplied by predicted speed of a launch clutch $\tau_{pdLC}\omega_{pLC}$ in applications that include a launch clutch 23) after the downshift occurs. The capability of the M/G 18 supplying the predicted demanded transmission input torque and predicted transmission power requirement may take into account the maximum torque capacity of the M/G 18 and the available energy that may be drawn from the battery 20 (i.e. battery charge). If the capacity of the M/G 18 is below the predicted demanded transmission input torque and/or predicted transmission power requirement, the method 100 moves to step 112 where the downshift of the transmission 24 is delayed until the disconnect clutch 26 is closed and the engine 14 has been started, or until a time delay limitation expired. If the capacity of the M/G 18 is not below the predicted demanded transmission input torque and/or predicted transmission power requirement, the method 100 moves to step 116 where the downshift is allowed to occur prior to closing the disconnect clutch 26 and starting the engine 14.

Returning to step 104, if a downshift in the gearing of the transmission 24 is not proposed at step 104, the method 100 moves to step 118. At step 118, the demanded transmission input torque is determined based on the current conditions of the vehicle. In applications that include a launch clutch 23, the demanded transmission input torque may be represented by the demanded launch clutch $\tau_{dLC}$ and in applications that include a torque converter 22, the demanded transmission input torque may be represented by the demanded impeller torque $\tau_{di}$.

In applications that include a launch clutch 23, at step 118, the current vehicle conditions may include the amount of torque being applied at the wheels, the power output at the wheels, the output torque of the powertrain $\tau_{out}$, the output power of the powertrain $\tau_{out}\omega_{out}$, the current launch clutch torque $\tau_{LC}$, the current launch clutch speed $\omega_{LC}$, the current launch clutch power $\tau_{LC}\omega_{LC}$, and the current gear selection. Algorithms that take into account the gearing ratio through the powertrain, which including the gear selection in the transmission 24, may be used to determine the demanded launch clutch $\tau_{dLC}$.

In the alternative, lookup tables that include the demanded launch clutch $\tau_{dLC}$, the desired torque at the wheels, or the desired output torque of the powertrain $\tau_{dout}$ in relation to the current vehicle conditions and the gear selection of the transmission 24 may be utilized to determine the demanded launch clutch $\tau_{dLC}$.

In applications that include a torque converter 22, at step 118 the current vehicle conditions may include the amount of torque being applied at the wheels, the power output at the wheels, the output torque of the powertrain $\tau_{out}$, the output power of the powertrain $\tau_{out}\omega_{out}$, the current turbine torque $\tau_t$, the current turbine power $\tau_t\omega_t$, the current impeller torque $\tau_i$, the current impeller power $\tau_i\omega_i$, and the current gear selection. Algorithms that take into account the gearing ratio through the powertrain, which including the gear selection in the transmission 24, may be used to determine the demanded impeller torque $\tau_{di}$.

In the alternative, lookup tables that include the demanded impeller torque $\tau_{di}$, the desired torque at the wheels, or the desired output torque of the powertrain $\tau_{dout}$ in relation to the current vehicle conditions and the gear selection of the transmission 24 may be utilized to determine the demanded impeller torque $\tau_{di}$.

In addition to the current conditions of the vehicle, the desired acceleration from cruise control and the driver power, torque, or speed demand may also be utilized when determining the demanded launch clutch torque $\tau_{dLC}$ or the demanded impeller torque $\tau_{di}$. The driver power, torque, or speed demand may be equivalent to the power, torque, and speed at the wheels or the power $\tau_{out}\omega_{out}$, torque $\tau_{out}$, and speed $\omega_{out}$ at the output of the powertrain. The driver power, torque, or speed demand is based on the current position of the accelerator pedal 52 plus a rate of change of the position of the accelerator pedal 52 over time.

Once the demanded impeller torque $\tau_{di}$ is determined at step 118, the method 100 moves to step 120 where it is determined if the M/G 18 (electric machine) is capable of supplying the demanded transmission input torque and the demanded transmission input power (which is the demanded impeller torque multiplied by demanded impeller speed, $\tau_{di}\omega_{di}$ in applications that include a torque converter 22 and demanded launch clutch torque multiplied by demanded speed of a launch clutch $\tau_{dLC}\omega_{dLC}$ in applications that include a launch clutch 23). The capability of the M/G 18 of supplying the demanded transmission input torque and the demanded transmission input power may take into account the maximum torque capacity of the M/G 18 and the available energy that may be drawn from the battery 20 (i.e. battery charge). If the capacity of the M/G 18 is below the demanded transmission input torque and/or the demanded transmission input power, the method 100 moves to step 122 where the disconnect clutch 26 is closed and the engine 14 is started. The engine may be started with an electric starter or by closing the disconnect clutch 26. If the capacity of the M/G 18 is not below the demanded transmission input torque and/or the demanded transmission input power the method 100 returns to step 104.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method of downshifting a transmission in a hybrid vehicle comprising:
   in response to an anticipated downshift in which a predicted impeller speed of a torque converter, which is an input to the transmission, will be outside a predetermined speed range after the downshift, closing a disconnect clutch configured to selectively couple an engine and electric machine, starting the engine, and downshifting the transmission after starting the engine.

2. The method of claim 1, wherein the predicted impeller speed is based on a predicted vehicle speed after the downshift.

3. The method of claim 2, wherein the predicted vehicle speed is based on a current vehicle speed and a driver demand to alter the current vehicle speed.

4. The method of claim 1, wherein the predicted impeller speed is also based on an expected slip across a bypass clutch of the torque converter after the downshift.

5. A method of downshifting a transmission in a hybrid vehicle comprising:
in response to an anticipated downshift in which a torque capacity of an electric machine will be less than a predicted demanded impeller torque of a torque converter after the downshift, closing a disconnect clutch configured to selectively couple an engine and the electric machine, starting the engine, and downshifting the transmission after starting the engine.

6. The method of claim 5, wherein the predicted demanded impeller torque is based on a desired output torque of the transmission after the downshift.

7. The method of claim 6, wherein the desired output torque of the transmission is based on a currently desired output torque of the transmission and a driver demand to alter the desired output torque of the transmission.

8. The method of claim 5, wherein the predicted demanded impeller torque is based on a demanded torque of an input to the transmission after the downshift.

9. The method of claim 8, wherein the demanded torque of the input is based on a current demanded torque of the input and a driver demand to alter the current demanded torque of the input.

10. The method of claim 5, wherein the predicted demanded impeller torque is also based on an expected slip across a bypass clutch of the torque converter after the downshift.

11. A vehicle comprising:
an engine;
an electric machine;
a disconnect clutch configured to selectively couple the engine and electric machine;
a torque converter configured to transmit power from the engine and electric machine to a transmission; and
a controller programmed to, in response to an anticipated transmission downshift in which a predicted impeller speed of the torque converter after the downshift will be outside a predetermined speed range or a torque capacity of the electric machine will be less than a predicted demanded impeller torque of the torque converter after the downshift, close the disconnect clutch and start the engine before downshifting.

12. The vehicle of claim 11, wherein the predicted impeller speed is also based on an expected slip across a bypass clutch of the torque converter after the downshift.

13. The vehicle of claim 11, wherein the predicted impeller speed of the torque converter is based on a current vehicle speed and a driver demand to alter the current vehicle speed.

14. The vehicle of claim 11, wherein the predicted demanded impeller torque of the torque converter is based on a currently desired output torque of the transmission and a driver demand to alter the desired output torque of the transmission.

* * * * *